United States Patent [19]
Fraley et al.

[11] Patent Number: 5,845,531
[45] Date of Patent: Dec. 8, 1998

[54] MULTI-SPEED MANUAL TRANSMISSION WITH REVERSE BRAKE

[75] Inventors: Glenn W. Fraley, Canton; Gerald S. Szczepanski, Detroit, both of Mich.

[73] Assignee: New Venture Gear, Inc., Troy, Mich.

[21] Appl. No.: 820,062

[22] Filed: Mar. 18, 1997

[51] Int. Cl.⁶ .................................................. F16H 3/08
[52] U.S. Cl. ................... 74/331; 74/329; 74/333
[58] Field of Search ............................... 74/325, 329, 331, 74/333

[56] References Cited

U.S. PATENT DOCUMENTS

| | | |
|---|---|---|
| 3,745,847 | 7/1973 | Worner et al. . |
| 4,189,041 | 2/1980 | Muller . |
| 4,225,024 | 9/1980 | Kuzma . |
| 4,294,338 | 10/1981 | Simmons . |
| 4,558,607 | 12/1985 | Szodfridt . |
| 4,598,599 | 7/1986 | Ikemoto . |
| 4,640,141 | 2/1987 | Knodel et al. . |
| 4,708,026 | 11/1987 | Ikemoto ................................. 74/331 X |
| 5,044,215 | 9/1991 | Watanabe .................................... 74/329 |
| 5,199,316 | 4/1993 | Hofmann ................................ 74/331 X |
| 5,381,878 | 1/1995 | Ohshima et al. . |
| 5,385,065 | 1/1995 | Hofmann .................................... 74/331 |
| 5,445,253 | 8/1995 | Reyes . |
| 5,704,247 | 1/1998 | Ahluwalia et al. ........................ 74/331 |
| 5,715,727 | 2/1998 | Janiszewski ............................... 74/325 |
| 5,722,291 | 3/1998 | Fraley et al. ........................... 74/331 X |
| 5,735,175 | 4/1998 | Forsyth ..................................... 74/331 |

FOREIGN PATENT DOCUMENTS 54-98451  8/1979  Japan .

*Primary Examiner*—Dirk Wright
*Assistant Examiner*—Peter T. Kwon
*Attorney, Agent, or Firm*—Harness, Dickey & Pierce, P.L.C.

[57] ABSTRACT

The present invention is directed to a reverse brake incorporated into the geartrain of a manual transmission which functions to stop inertial rotation of the input shaft prior to engagement of reverse gear. In particular, a constant-mesh gearset is operable with a first clutch to establish a forward drive connection between the input shaft and the output shaft, and is further operable with a second clutch to brake rotation of the input shaft without establishing a forward drive connection with the output shaft.

25 Claims, 3 Drawing Sheets

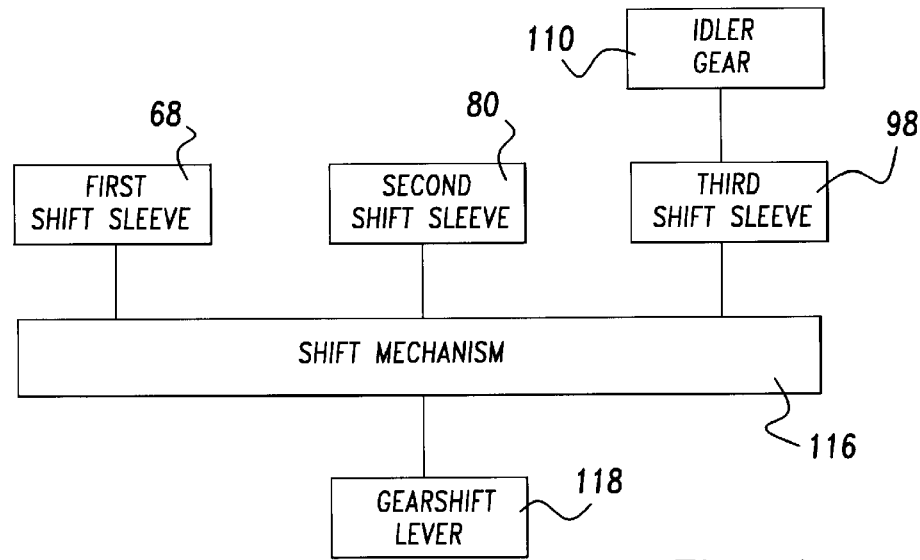
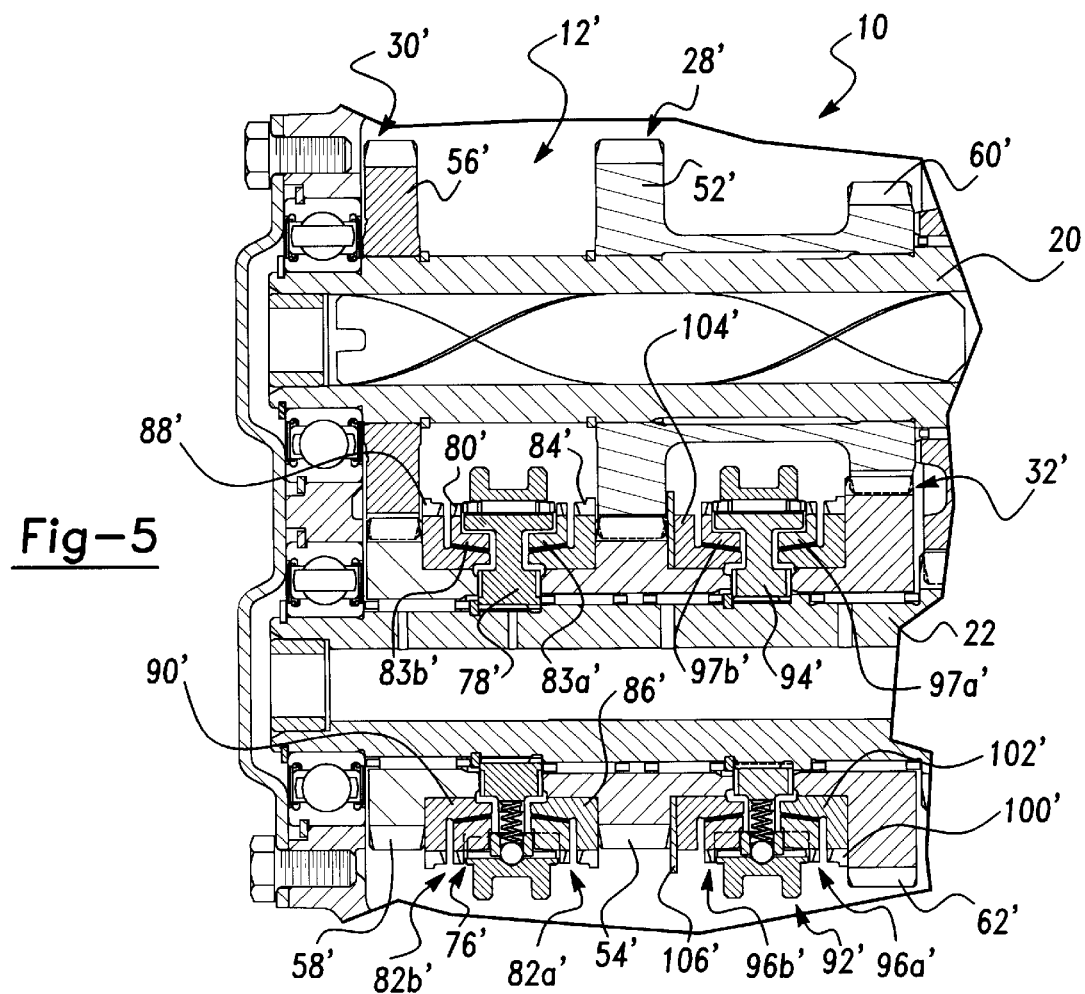

MULTI-SPEED MANUAL TRANSMISSION WITH REVERSE BRAKE

BACKGROUND OF THE INVENTION

The present invention relates generally to multi-speed transmissions for use in motor vehicles. More specifically, the present invention is directed to a manual transmission having a reverse brake arrangement.

As is well known, manual transmissions are shifted by the vehicle operator moving a gearshift lever which functions, through a shift mechanism, to selectively engage one of a plurality of gearsets for driving the output shaft in a first direction and at a predetermined speed ratio relative to the input shaft. In particular, most manual transmissions include a plurality of synchromesh gearsets which can be selectively engaged for establishing the different forward gears. Additionally, many manual transmissions are equipped with a reverse idler assembly which can be selectively engaged for establishing the reverse gear. Typically, the reverse idler assembly includes a reverse input gear driven by the input shaft, a reverse output gear driven by the output shaft, and a reverse idler gear which is selectively movable into meshed engagement with the reverse input gear and the reverse output gear for driving the output shaft in a second direction and at a predetermined speed ratio relative to the input shaft for establishing the reverse gear.

During operation of the motor vehicle, one of the forward gears is typically disengaged immediately prior to selection of the reverse gear. As such, the input shaft is free to continue rotating due to inertia under a substantially no-load condition until, through friction and windage losses, the inertia of the input shaft is dissipated and rotation is arrested. If the vehicle operators moves the gearshift lever in an attempt to engage the reverse idler gear while the input shaft is still rotating, the teeth of the reverse idler gear will strike the teeth of the reverse input gear. As such, the force applied by the vehicle operator through the gearshift lever results in an undesirable clattering as the teeth of the reverse idler gear are forced into contact with the teeth of the reverse input gear, but yet are unable to mesh therewith because of the relative rotational speeds. This condition, commonly referred to as "reverse clash", results in an unpleasant grinding noise and the clashing is felt by the vehicle operator. To avoid this condition, the vehicle operator must wait for the input shaft to stop rotating before the gearshift lever can be moved quietly and smoothly to engage the reverse gear. Unfortunately, any time delay required before the gearshift lever can be moved to engage reverse gear in order to avoid the occurrence of reverse clash is objectionable. Thus, it follows that reverse clash can be virtually eliminated by stopping rotation of the input shaft before an attempt is made to engage the reverse idler gear with the reverse input gear.

One known technique for eliminating reverse clash is to provide the transmission with a synchronized reverse gear assembly. Exemplary synchronized reverse gear assemblies are disclosed in U.S. Pat. Nos. 4,558,607, 4,640,141 and 5,385,065. However, the cost and complexity associated with incorporating synchronized reverse gear assembly into the transmission is not always commercially justified. As an alternative, several reverse brake arrangements have been developed for use in manual transmissions equipped with a non-synchronized reverse gear assembly. Exemplary reverse brake arrangements are disclosed in U.S. Pat. Nos. 4,225,024, 4,294,338 and 4,598,599. While these prior known devices have proven to be satisfactory for then intended purpose, each is attendant with its own drawbacks and inherent limitations. Thus, there remains a need in the art for a simple, inexpensive reverse brake for a manual transmission which is effective to eliminate gear clash when shifting the transmission into reverse gear from a forward gear.

SUMMARY OF THE INVENTION

The present invention is directed to a multi-speed manual transmission for use in motor vehicles having a geartrain arranged to use a common gearset for establishing a forward gear and braking rotation of the input shaft. In particular, the transmission includes: an input shaft; an output shaft; a gearset including a first gear rotatably supported on the input shaft, and a second gear fixed to the output shaft and meshed with the first gear; a first synchronizer clutch movable from a first position displaced from the gearset toward a second position for causing speed synchronization between the input shaft and the first gear, the first synchronizer clutch is further operable in its second position for releasably coupling said input gear to said input shaft for driving the output shaft in a first direction relative to the input shaft to establish a forward gear; a third gear movable between a first position disengaged from meshed engagement with the input and output shafts and a second position in meshed engagement therewith for driving the output shaft in a second direction relative to the input shaft to establish a reverse gear; a second synchronizer clutch movable from a first position displaced from the first gear toward a second position for causing speed synchronization between the input shaft and the first gear, wherein the first gear is not coupled to the input shaft when the second synchronizer clutch is in its second position; and a shift mechanism for moving the first and second synchronizer clutches between each of their respective positions, the shift mechanism couples the third gear to the second synchronizer clutch such that the third gear moves between its first and second positions in response to movement of the second synchronizer clutch between its first and second positions. Since the output shaft is typically held against rotation when the transmission is shifted into the reverse gear, movement of second synchronizer clutch to its second position results in the input shaft being braked against the first gear, thereby stopping inertial rotation of the input shaft prior to shifting of the transmission into the reverse gear.

In accordance with an alternative embodiment, the gearset is arranged such that the first gear is fixed to the input shaft, the second gear is rotatably supported from the output shaft, the first synchronizer functions to releasably couple the output shaft to the gearset for establishing the forward gear, and the second synchronizer is movable between from its first position to its second position to cause speed synchronization between the output shaft and the input shaft which results in the braking of the input shaft.

BRIEF DESCRIPTION OF THE DRAWINGS

Further objects, features and advantages of the present invention will become apparent to those skilled in the transmission art from studying the following description and the accompanying drawings in which:

FIG. 4 is a block diagram of a shift mechanism for use with the transmission; and FIG. 5 is a partial schematic illustration of an alternative geartrain arrangement.

DETAILED DESCRIPTION OF THE INVENTION

In general, the present invention is directed to a reverse brake incorporated into the geartrain of a manual transmission which functions to stop inertial rotation of the input shaft prior to engagement of reverse gear. In particular, a constant-mesh gearset is operable with a first clutch to establish a forward drive connection between the input shaft and the output shaft, and is further operable with a second clutch to brake rotation of the input shaft without establishing a forward drive connection with the output shaft.

Figure 1:
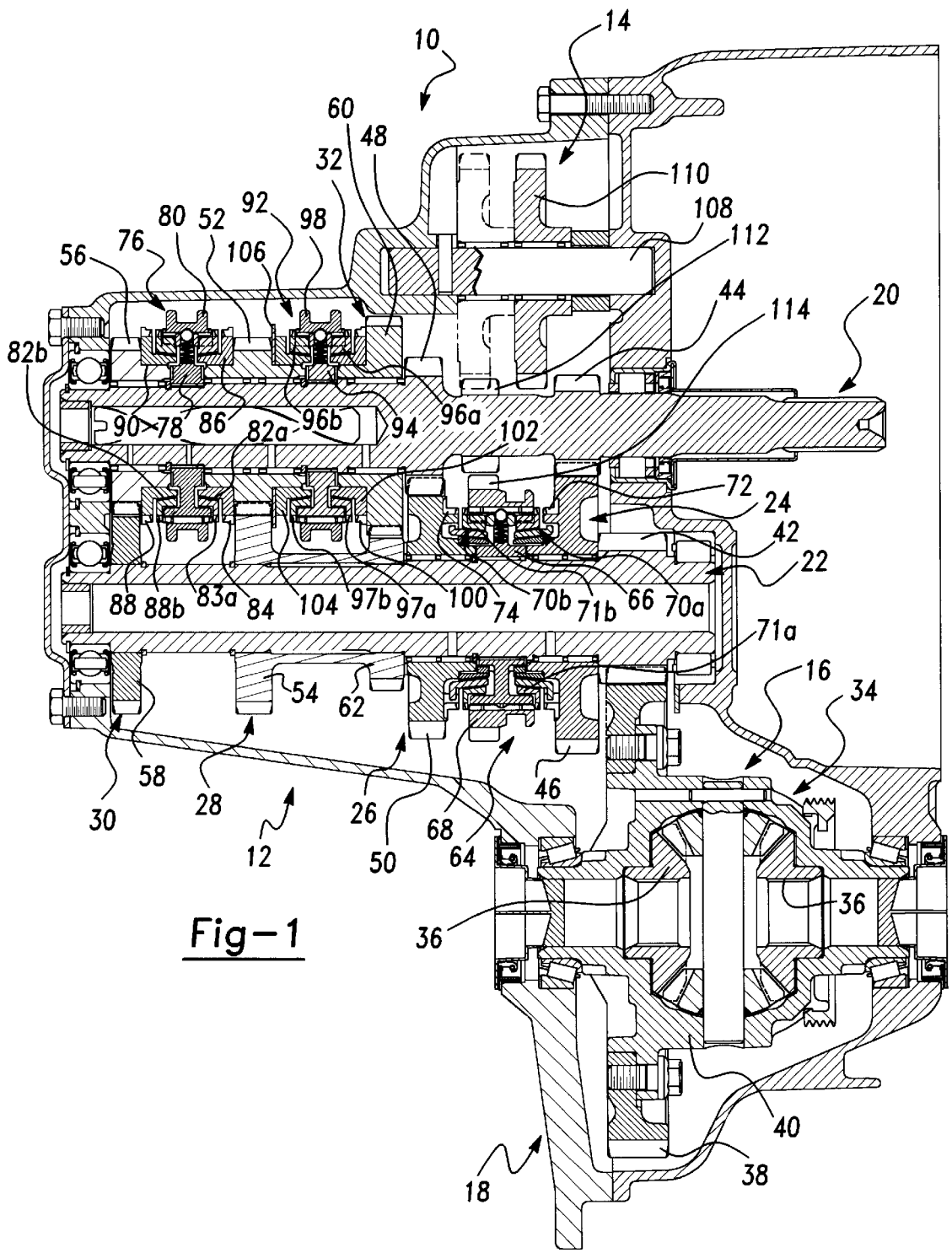
FIG. 1 is a section view of a multi-speed transmission equipped with a reverse brake according to a preferred embodiment of the present invention.

Referring to FIG. 1, a multi-speed transmission 10 of the transaxle variety is shown which is adapted for use in front wheel drive motor vehicles. In general, transmission 10 includes a multi-speed geartrain 12, a reverse idler assembly 14, and a power transfer mechanism 16, all of which are operably mounted within a transmission housing 18. Geartrain 12 includes an input shaft 20 which is adapted to be rotatably driven by the output shaft of the motor vehicle's engine and which is connectable thereto through engagement of a manually-operable clutch (not shown). Geartrain 12 also includes an output shaft 22 and a series of constant-mesh gearsets 24, 26, 28, 30 and 32. Each gearset can be selectively engaged for coupling output shaft 22 to input shaft 20 and establishing five different forward speed ratios (i.e., five forward gears). Engagement of any one of the constant-mesh gearsets results in driven rotation of output shaft 22 in a first direction relative to input shaft 20. Likewise, reverse idler assembly 14 can be selectively engaged for coupling output shaft 22 to input shaft 20 and establishing a reverse speed ratio (i.e., reverse gear). Engagement of rear idler assembly 14 results in driven rotation of output shaft 22 in a second direction relative to input shaft 20.

Power transfer mechanism 16 is rotatably driven by output shaft 22 and includes a differential assembly 34 that is operable for delivering drive torque through a pair of side gears 36 to a pair of front wheel drive shafts (not shown). A drive gear 38 is shown fixed to housing 40 of differential assembly 34 and is in constant meshed engagement with an output gear 42 formed on output shaft 22. As is known, driven rotation of housing 40 results in side gears 36 being rotatively driven while permitting speed differentiation therebetween. As seen, input shaft 20, output shaft 22, reverse idler assembly 14 and differential assembly 34 are all rotatably supported within housing 18 by suitable bearings. While the present invention is specifically disclosed in association with a transaxle-type transmission, it will be understood that the teachings are also applicable to rear wheel drive transmissions wherein power transfer mechanism 16 is eliminated and output shaft 22 is directly coupled to the vehicle's rear driveline.

With continued reference to FIG. 1, first gearset 24 is shown to include a first input gear 44 fixed to input shaft 20 and a first speed gear 46 rotatably supported on output shaft 22. First input gear 44 is in constant mesh with first speed gear 46 for defining a first power transmission path from input shaft 20 to output shaft 22 which, when engaged, establishes a drive connection therebetween at a first speed ratio. Second gearset 26 includes a second input gear 48 fixed to input shaft 20 and a second speed gear 50 rotatably supported on output shaft 22. Second input gear 48 is in constant mesh with second speed gear 50 for defining a second power transmission path from input shaft 20 to output shaft 22 which, when engaged, establishes a drive connection therebetween at a second speed ratio. Third gearset 28 includes a third input gear 52 rotatably supported on input shaft 20 which is in constant mesh with a third speed gear 54 fixed to output shaft 22 for defining a third power transmission path from input shaft 20 to output shaft 22 which, when engaged, establishes a drive connection therebetween at a third speed ratio. Fourth gearset 30 includes a fourth input gear 56 rotatably supported on input shaft 20 and which is in constant mesh with a fourth speed gear 58 fixed to output shaft 22, thereby defining a fourth power transmission path which, when engaged, establishes a drive connection therebetween at a fourth speed ratio. Finally, fifth gearset 32 includes a fifth input gear 60 rotatably supported on input shaft 20 and which is in constant mesh with a fifth speed gear 62 fixed to output shaft 22, thereby defining a fifth power transmission path which, when engaged, establishes a drive connection therebetween at a fifth speed ratio.

As noted, geartrain 12 is arranged to selectively deliver drive torque from input shaft 20 to output shaft 22 through one of the five different power transmission paths for establishing five different forward gears. To this end, each gearset of geartrain 12 is associated with a selectively-engageable synchronizer clutch. More particularly, a first synchronizer clutch 64 is operably installed between first gearset 24 and second gearset 26 and includes a first hub 66 fixed to output shaft 22, a first shift sleeve 68, and a pair of cone-type synchronizers 70a and 70b. First synchronizer clutch 64 is of the double-acting variety such that first shift sleeve 68 is splined for common rotation with, and bi-directional axial movement on, first hub 66 for selectively coupling one of first and second gearsets 24 and 26, respectively, to output shaft 22 and establishing either of the first or second forward gears. In particular, forward axial movement of first shift sleeve 68 from its neutral position shown acts to energize synchronizer 70a for generating a synchronizing cone torque which causes speed synchronization between first gearset 24 and output shaft 22. Upon completion of speed synchronization, first shift sleeve 68 moves through the teeth on a blocker ring 71a and into locked engagement with clutch teeth 72 on first speed gear 46, thereby engaging the first power transmission path and establishing the first forward gear. In a like manner, rearward axial movement of first shift sleeve 68 from its neutral position acts to energize synchronizer 70b for generating a synchronizing cone torque which causes speed synchronization between second gearset 26 and output shaft 22. Upon complete speed synchronization, first shift sleeve 68 moves through the teeth on a blocker ring 71b and into locked engagement with clutch teeth 74 on second speed gear 50, thereby engaging the second power transmission path and establishing the second forward gear.

A second synchronizer clutch 76 is operably installed between third gearset 28 and fourth gearset 30 and includes a second hub 78 fixed to input shaft 20, a second shift sleeve 80, and a pair of cone-type synchronizers 82a and 82b. Second synchronizer clutch 76 is also a double-acting arrangement with second shift sleeve 80 splined on second hub 78 for common rotation therewith and bi-directional axial movement thereon for selectively coupling one of third gearset 28 and fourth gearset 30 to input shaft 20 and establishing either of the third or fourth forward gears. Specifically, forward axial movement of second shift sleeve 80 from its neutral position shown acts to energize synchronizer 82a for generating a synchronizing cone torque to cause speed synchronization between third gearset 28 and input shaft 20. Following completion of speed synchronization, second shift sleeve 80 moves through the teeth on a blocker ring 83a and into locked engagement with clutch teeth 84 formed on a clutch ring 86 which is fixed to third input gear 52, thereby engaging the third power transmission path and establishing third forward gear. Rearward axial movement of second shift sleeve 80 from its neutral position acts to energize synchronizer 82b for generating a synchronizing cone torque to cause speed synchronization between fourth gearset 30 and input shaft 20. Following completion of speed synchronization, second shift sleeve 80 moves through the teeth on blocker ring 83b and into locked engagement with clutch teeth 88 formed on a clutch ring 90 which is fixed to fourth input gear 56, thereby engaging the fourth power transmission path and establishing the fourth forward gear.

A third synchronizer clutch 92 is operably installed between third gearset 28 and fifth gearset 32 and includes a third hub 94 fixed to input shaft 20, a pair of synchronizers 96a and 96b, and a third shift sleeve 98. Third synchronizer clutch 92 is also of the double-acting variety such that third shift sleeve 98 is splined for common rotation with and bi-directional axial movement on, third hub 94 for either selectively coupling fifth gearset 32 to input shaft 20 or braking rotation of input shaft 20 through third gearset 28 without coupling third gearset 28 thereto. In particular, forward axial movement of third shift sleeve 98 from its neutral position shown acts to energize synchronizer 96a for generating a synchronizing cone torque which causes speed synchronization between fifth gearset 32 and input shaft 20. Following completion of speed synchronization, third shift sleeve 98 moves through the teeth on a blocker ring 97a into locked engagement with clutch teeth 100 formed on a clutch ring 102 fixed to fifth input gear 60, thereby engaging the fifth power transmission path and establishing the fifth forward gear.

Rearward axial movement of third shift sleeve 98 from its neutral position acts to energize synchronizer 96b for generating a synchronizing cone torque which causes speed synchronization between third gearset 28 and input shaft 20. However, in contrast to the forward movement of second shift sleeve 80 for engaging third gearset 28 when it is desired to establish the third forward gear, such rearward axial movement of third shift sleeve 98 results in response to the vehicle operator attempting to shift into the reverse gear. Since the reverse gear is normally selected when the vehicle is in a non-motive condition, the front wheel drive shafts and differential assembly 34 hold output shaft 22 and third speed gear 54 of third gearset 28 against rotation. As such, the speed synchronization process between third gearset 28 and input shaft 20 results in the stopping or braking of rotation of input shaft 20. To provide means for generating the synchronizing cone torque, a brake ring 104 is shown fixed to third input gear 52. Brake ring 104 is similar to clutch ring 102 except that brake ring 104 does not have clutch teeth formed thereon. As such, upon complete speed synchronization, third shift sleeve 98 moves through the teeth on a blocker ring 97b but does not lockingly engage brake ring 104, whereby third shift sleeve 98 does not engage third gearset 28. A stop ring 106 is provided between brake ring 104 and third input gear 52 to limit rearward movement of third shift sleeve 98.

As seen in FIG. 1, each of shift sleeves 68, 80 and 98 is shown centrally positioned in a neutral or non-engaged position for cumulatively establishing a neutral mode in which drive torque is not transferred from input shaft 20 to output shaft to 22 through any of the gearsets or reverse idler assembly 14.

Synchronizers 70a and 70b are shown to be of the dual-cone variety which are energized by a set of spring-biased struts supported in guideways formed in first hub 66 for limited bi-directional axial movement relative to blocker rings 71a and 71b. As is conventional, blocker rings 71a and 71b function to inhibit first shift sleeve 68 from passing therethrough and into respective locked engagement with clutch teeth 72 and 74 until the rotary speed of output shaft 22 is substantially synchronous with that of input shaft 20. Synchronizers 82a and 82b are shown to be of the single-cone variety which are also energized by a set of spring-biased struts supported for limited bi-directional axial movement in guideways formed in second hub 78. In a similar fashion, blocker rings 83a and 83b function to inhibit second shift sleeve 80 from passing therethrough and into respective locked engagement with clutch teeth 84 and 88 until the rotary speed of input shaft 20 is substantially equal to that of output shaft 22. Finally, synchronizers 96a and 96 are also shown to be of the single-cone type which are energized by spring-biased struts supported for limited bi-directional axial movement in guideways formed in third hub 94. Blocker ring 97a functions to inhibit third shift sleeve 98 from passing therethrough and into locked engagement with clutch ring 102 until the rotary speed of input shaft 20 is substantially equal to that of output shaft 22. Moreover, blocker ring 97b functions to inhibit third shift sleeve 98 from passing therethrough until the rotary speed of input shaft 20 is equal to that of output shaft 22. As will be appreciated, the synchronizers can be of any conventional construction currently known in the manual transmission art for causing speed synchronization between two relatively rotatable components, with such alternative arrangements considered equivalent to that shown.

To provide means for establishing the reverse gear, reverse idler assembly 14 is shown in FIG. 1 to include an idler shaft 108 fixed to housing 18, an idler gear 110 rotatably supported on idler shaft 104, a reverse input gear 112 fixed to input shaft 20, and a reverse output gear 114 formed as part of first shift sleeve 68. Idler gear 110 is connected by the transmission's shift system to third shift sleeve 98 for coordinated movement therebetween such that idler gear 110 is located in the position shown when third shift sleeve 98 is in its centered neutral position. As such, idler gear 110 is moved forwardly in response to forward movement of third shift sleeve 98 into engagement with clutch ring 102. Likewise, idler gear 110 is moved into the position shown by phantom lines when third shift sleeve 98 is moved rearwardly past brake ring 104. When idler gear 110 is in the engaged position shown by the phantom lines, it is in meshed engagement with reverse input gear 112 and reverse output gear 114, thereby establishing the reverse gear ratio drive connection between input shaft 20 and output shaft 22. Since the energized engagement of cone-type synchronizer 96b with brake ring 104 results in braking of rotation of input shaft 20, idler gear 110 can move into engagement with reverse input gear 112 and reverse output gear 114 without generating gear clash. Thus, the present invention is directed to a reverse brake arrangement using a non-toothed brake ring in conjunction with a speed synchronizer for braking the input shaft to an existing input gear.

Figures 2, 3:
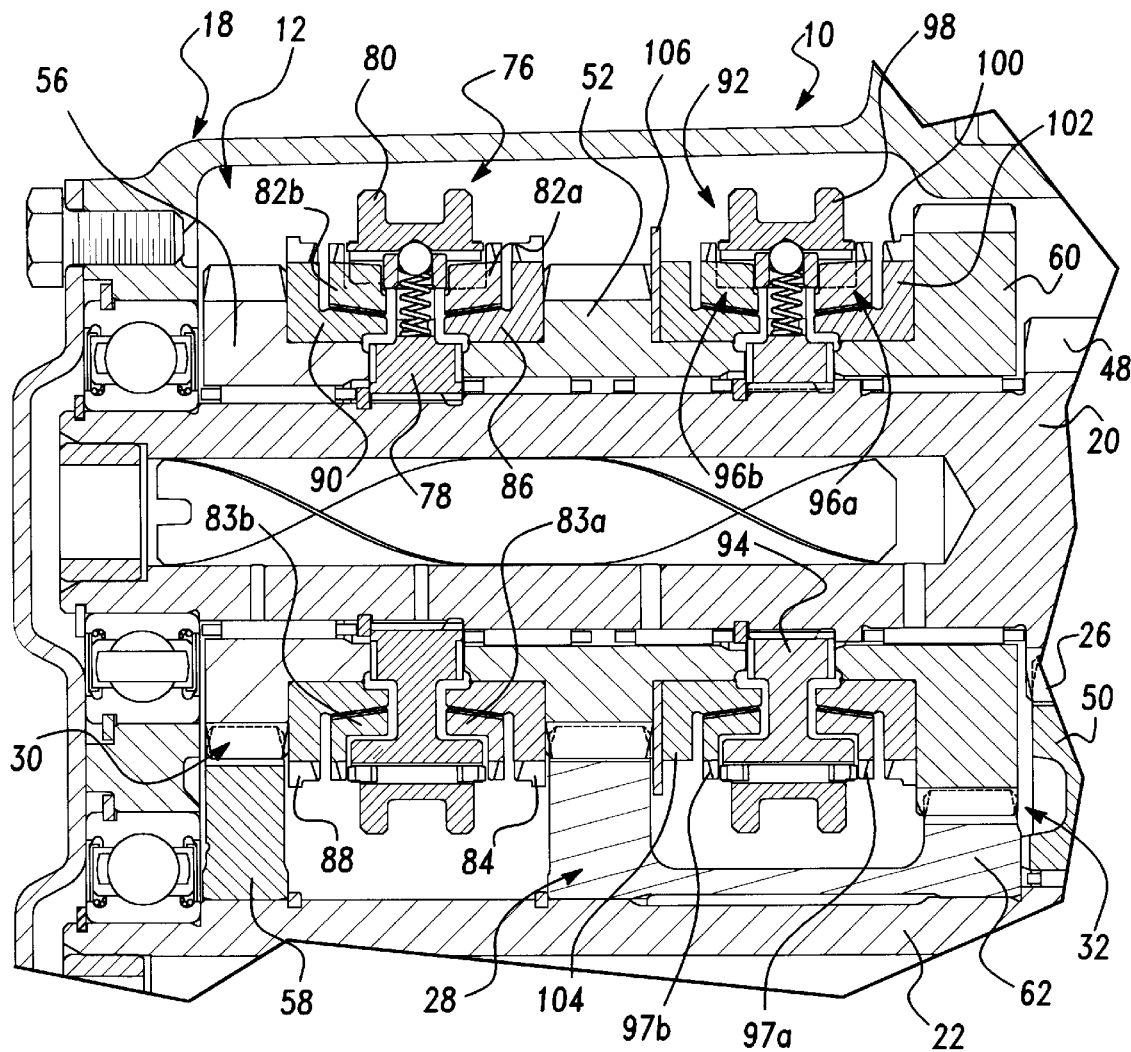
FIG. 2 is an enlarged partial view of FIG. 1 showing the components of the reverse brake in greater detail.
FIG. 3 is a shift gate diagram showing the forward and reverse positions for the gearshift lever.

FIG. 3 shows the gate or shift pattern for the gearshift lever used to establish the five forward gears and the reverse gear. FIG. 4 schematically illustrates a shift mechanism 116 which interconnects each of shift sleeves 68, 80 and 98 to a gearshift lever 118 such that the vehicle operator can select the desired gear. As noted, shift mechanism 116 also interconnects idler gear 110 for coordinated movement with third shift sleeve 98. Shift mechanism 116 can be any known mechanical, hydraulic or electrically-actuated system that is capable of controlling movement of shift sleeves 68, 80 and 98 and idler gear 110.

Since the present invention is directed to use of a common constant-mesh gearset for establishing a forward drive connection between input shaft 20 and output shaft 22 and for braking input shaft 20 against output shaft 22 without establishing a drive connection therewith, the particular arrangement of the gearsets shown in FIGS. 1 and 2 is not intended to be limiting, but merely exemplary of but one suitable geartrain arrangement. To further clarify this point, FIG. 5 shows a portion of transmission 10 having an alternative multi-speed geartrain 12' where all of the input gears are fixed to input shaft 20' and all of the speed gears are rotatably supported on output shaft 22'. Due to the similar function of geartrain 12' to that of geartrain 12, its components are identified by like reference numerals having a primed designation which is indicative of the modified geartrain arrangement.

As seen from FIG. 5, third gearset 28' includes a third input gear 52' fixed to input shaft 20' and which is in constant-mesh with a third speed gear 54' rotatably supported on output shaft 22' for defining a third power transmission path from input shaft 20' to output shaft 22' which, when engaged, establishes a drive connection therebetween at a third speed ratio. Fourth gearset 30 includes a fourth input gear 56' fixed to input shaft 20' and which is in constant-mesh with a fourth speed gear 58' rotatably supported on output shaft 22', thereby defining a fourth power transmission path, which, when engaged, establishes a drive connection therebetween at a fourth speed ratio. Fifth gearset 32' includes a fifth input gear 60' fixed to input shaft 20' and which is in constant-mesh with a fifth speed gear 62' rotatably supported on output shaft 22', thereby defining a fifth power transmission path which, when engaged, establishes a drive connection therebetween at a fifth speed ratio.

Geartrain 12' includes second synchronizer clutch 76' operably installed between third gearset 28' and fourth gearset 30' and includes a second hub 78' fixed to output shaft 22'. Second shift sleeve 80' is splined on second hub 78' for common rotation therewith and bi-directional axial movement thereon for selectively coupling one of third gearset 28' and fourth gearset 30' to output shaft 22' and establishing either of the third or fourth forward gears. Forward axial movement of second shift sleeve 80' from its neutral position shown acts to energize synchronizer 82a' for generating a synchronizing cone torque which causes speed synchronization between third gearset 28' and output shaft 22'. Following completion of speed synchronization, second shift sleeve 80' moves through the teeth of blocker ring 83a' and into locked engagement with clutch teeth 84' formed on clutch ring 86' which is fixed to third speed gear 54', thereby engaging the third power transmission path and establishing third forward gear. Rearward axial movement of second shift sleeve 80' from its neutral position acts to energize synchronizer 82b' for generating a synchronizing cone torque to cause speed synchronization between fourth gearset 30' and output shaft 22'. Following completion of speed synchronization, second shift sleeve 80' moves through the teeth on blocker ring 83b' and into locked engagement with clutch teeth 88' formed on clutch ring 90' which is fixed to fourth speed gear 58', thereby engaging the fourth power transmission path and establishing the fourth forward gear.

Third synchronizer clutch 92' is operably installed between third gearset 28' and fifth gearset 32' and includes a third hub 94' fixed to output shaft 20', synchronizers 96a' and 96b', and third shift sleeve 98'. Forward axial movement of third shift sleeve 98' from its neutral position shown acts to energize synchronizer 96a' for generating a synchronizing cone torque which causes speed synchronization between fifth gearset 32' and output shaft 22'. Following completion of speed synchronization, third shift sleeve 98' moves through the teeth on blocker ring 97a' and into locked engagement with clutch teeth 100' formed on clutch ring 102' fixed to fifth speed gear 62', thereby engaging the fifth power transmission path and establishing the fifth forward gear. Rearward axial movement of third shift sleeve 98' from its neutral position acts to energize synchronizer 96b' for generating a synchronizing cone torque which causes speed synchronization between third gearset 28' and output shaft 22'. In a similar manner to that previously disclosed, such rearward axial movement of third shift sleeve 98' results in response to the vehicle operator attempting to shift transmission 10 into reverse gear. Thus, such rearward axial movement of third shift sleeve 98' causes speed synchronization between output shaft 22' and third gearset 28' for effectively stopping or braking rotation of input shaft 20'. Upon complete speed synchronization, third shift sleeve 98' moves through teeth on blocker ring 97b' but does not lockingly engage brake ring 104' which is fixed to third speed gear 54'. As before, brake ring 104' is formed without clutch teeth such that third shift sleeve 98' is inhibited from engaging third gearset 28'.

The foregoing discussion discloses and describes preferred embodiments of the present invention. It is contemplated that the reverse brake disclosed herein could easily be adapted for use with other multi-speed geartrains arranged for either front-wheel drive or rear-wheel drive vehicular applications. As such, those skilled in the art will readily recognize from such discussion, and from the accompanying drawings and claims, that various changes, modifications and variations can be made therein without departing from the true spirit and fair scope of the invention as defined in the following claims.

What is claimed is:

1. A manual transmission, comprising:

an input shaft adapted to be driven in a first direction;

an output shaft;

a gearset including an input gear rotatably supported on said input shaft, and a speed gear fixed to said output shaft and meshed with said input gear;

a first synchronizer clutch movable from a first position displaced from said gearset toward a second position for causing speed synchronization between said input shaft and said input gear, said first synchronizer clutch is further operable in said second position for releasably coupling said input gear to said input shaft for driving said output shaft in a first direction relative to said input shaft to establish a forward gear;

an idler gear movable between a first position released from meshed engagement with said input and output shafts and a second position in meshed engagement therewith for driving said output shaft in a second direction relative to said input shaft to establish a reverse gear;

a second synchronizer clutch movable from a first position displaced from said input gear toward a second position for causing speed synchronization between said input shaft and said input gear, and wherein said input gear is uncoupled from said input shaft when said second synchronizer clutch is in said second position; and a shift mechanism for moving said first and second synchronizer clutches between their respective positions, said shift mechanism couples said idler gear to said second synchronizer clutch such that said idler gear moves between its first and second positions in response to movement of said second synchronizer clutch between its first and second positions.

2. The transmission of claim 1 wherein said second synchronizer clutch includes a shift sleeve operably mounted on said input shaft for rotation therewith and axial movement relative thereto, and a synchronizer disposed between said shift sleeve and said input gear, said shift sleeve is movable between said first position whereat said synchronizer is non-energized and said input shaft is free to rotate relative to said input gear and said second position whereat said synchronizer is energized for inhibiting rotation of said input shaft relative to said input gear.

3. The transmission of claim 1 wherein said second synchronizer clutch is operable to brake rotation of said input shaft upon movement thereof toward its second position.

4. The transmission of claim 3 wherein said output shaft is held against rotation when said second synchronizer clutch is moved from its first position toward its second position such that said input shaft is braked against said input gear, whereby said idler gear is moved into its second position with no relative rotation between said input shaft and said output shaft.

5. The transmission of claim 1 further comprising a second gearset including a second input gear rotatably supported on said input shaft, and a second speed gear fixed to said output shaft and meshed with said second input gear, and wherein one of said first and second synchronizer clutches is movable from its first position to a third position for causing speed synchronization between said input shaft and said second input gear and thereafter releasably coupling said second input gear to said input shaft for driving said output shaft in said first direction and establishing a second forward gear.

6. The transmission of claim 1 further comprising a differential having an input driven by said output shaft and a pair of outputs adapted to be coupled to a set of wheels.

7. A manual transmission, comprising:

a first shaft;

a second shaft;

a gearset including a first gear fixed to said first shaft, and a second gear rotatably supported on said second shaft and meshed with said first gear;

a first synchronizer clutch operable for causing speed synchronization between said second shaft and said gearset, said first synchronizer clutch is further operable for releasably coupling said second gear to said second shaft for driving said second shaft in a first direction in response to rotation of said first shaft;

a third gear movable between a first position disengaged from meshed engagement with said first and second shafts and a second position in meshed engagement therewith for driving said second shaft in a second direction in response to rotation of said first shaft;

a second synchronizer clutch operable for causing speed synchronization between said second shaft and said gearset; and a shift mechanism for selectively actuating said first synchronizer clutch to establish a forward gear and for selectively actuating said second synchronizer clutch to establish a reverse gear, said shift mechanism operable to move said third gear to its second position following actuation of said second synchronizer clutch.

8. The transmission of claim 7 wherein said second synchronizer clutch includes a shift sleeve operably supported on said second shaft for rotation therewith and axial movement relative thereto, and a synchronizer disposed between said shift sleeve and second gear, said shift sleeve is movable from a first position whereat said synchronizer is non-energized and said gearset is free to rotate relative to said second shaft in response to rotation of said first shaft, and a second position whereat said synchronizer is energized and said gearset is prevented from rotating relative to said second shaft.

9. The transmission of claim 7 wherein said second synchronizer clutch is operable to brake rotation of said first shaft upon movement thereof toward its second position.

10. The transmission of claim 9 wherein said second shaft is held against rotation when said second synchronizer clutch is moved from its first position toward its second position such that said first shaft is braked against rotation, whereby said third gear is moved into its second position with no relative rotation between said first shaft and said second shaft.

11. The transmission of claim 7 further comprising a differential having an input driven by said second shaft and a pair of outputs adapted to be coupled to a set of wheels.

12. A manual transmission, comprising:

an input shaft adapted to be driven in a first direction;

an output shaft;

a gearset including an input gear rotatably supported on said input shaft, and a speed gear fixed to said output shaft and meshed with said input gear;

a first synchronizer clutch operable for causing speed synchronization between said input shaft and said gearset, and said first synchronizer clutch is further operable for releasably coupling said input gear to said input shaft for driving said output shaft in a first direction in response to rotation of said input shaft for establishing a forward gear;

an idler gear movable between a first position disengaged from meshed engagement with said input and output shafts and a second position in meshed engagement therewith for driving said output shaft in a second direction in response to rotation of said input shaft for establishing a reverse gear;

a second synchronizer clutch operable for causing speed synchronization between said input shaft and said gearset; and a shift mechanism for selectively actuating said first synchronizer clutch to establish said forward gear and for selectively actuating said second synchronizer clutch to establish said reverse gear, said shift mechanism causing movement of said idler gear to its second position in response to actuation of said second synchronizer clutch.

13. The transmission of claim 12 wherein said second synchronizer clutch is actuated when said output shaft is held against rotation such that said gearset brakes rotation of said input shaft.

14. The transmission of claim 12 further comprising a differential having an input driven by said output shaft and a pair of outputs adapted to be coupled to a set of wheels.

15. A manual transmission, comprising:

an input shaft adapted to be rotatably driven;

an output shaft;
a first gearset including a first input gear rotatably supported on said input shaft, and a first speed gear fixed to said output shaft and meshed with said first input gear;
a second gearset including a second input gear rotatably supported on said input shaft, and a second speed gear fixed to said output shaft and meshed with said second input gear;
a first clutch for releasably coupling one of said first and second input gears to said input shaft for driving said output shaft in a first direction relative to said input shaft at one of a first and second forward speed ratio;
a reverse gear movable between a first position disengaged from meshed engagement with said input and output shafts, and a second position in meshed engagement therewith for driving said output shaft in a second direction relative to said input shaft at a reverse speed ratio;
a third gearset including a third input gear rotatably supported on said input shaft, and a third speed gear fixed to said output shaft and meshed with said third input gear;
a second clutch movable from a first position to a second position for coupling said third input gear to said input shaft for driving said output shaft in said first direction relative to said input shaft at a third forward speed ratio, and said second clutch is movable from said first position to a third position for braking rotation of said input shaft relative to said output shaft; and
a shift mechanism for coupling said reverse gear to said second synchronizer clutch such that said reverse gear moves between its first and second positions in response to movement of said second clutch between its first and third positions.

16. The transmission of claim 15 wherein said first gearset is located between said second and third gearsets.

17. The transmission of claim 15 wherein said first clutch is supported on said input shaft between said first and second gearsets and includes a first shift sleeve movable from a first position to a second position for releasably coupling said first input gear to said input shaft for establishing a first drive connection between said input shaft and said output shaft at said first forward speed ratio, said first shift sleeve is movable from said first position to a third position for releasably coupling said second input gear to said input shaft for establishing a second drive connection between said input shaft and said output shaft at said second forward speed ratio, and wherein said second clutch is supported on said input shaft between said first and third gearsets and includes a second shift sleeve movable from said first position to said second position for coupling said third input gear to said input shaft for establishing a third drive connection between said input shaft and said output shaft at said third forward speed ratio, and wherein movement of said second shift sleeve from said first position to said third position occurs when said output shaft is substantially non-motive such that rotation of said first gearset is inhibited which causes rotation of said input shaft to be inhibited without coupling said second shift sleeve to said first input gear.

18. A manual transmission, comprising:
an input shaft adapted to be rotatably driven;
an output shaft;
a first gearset including a first input gear fixed to said input shaft, and a first speed gear rotatably supported on said output shaft and meshed with said first input gear;
a second gearset including a second input gear fixed to said input shaft, and a second speed gear rotatably supported on said output shaft and meshed with said second input gear;
a first clutch for releasably coupling one of said first and second speed gears to said output shaft for driving said output shaft in a first direction relative to said input shaft at one of a first and second forward speed ratio;
a reverse gear movable between a first position disengaged from meshed engagement with said input and output shafts, and a second position in meshed engagement therewith for driving said output shaft in a second direction relative to said input shaft at a reverse speed ratio;
a third gearset including a third input gear fixed to said input shaft, and a third speed gear rotatably supported on said output shaft and meshed with said third input gear;
a second clutch movable from a first position to a second position for coupling said third speed gear to said output shaft for driving said output shaft in said first direction relative to said input shaft at a third forward speed ratio, and said second clutch is movable from said first position to a third position for braking rotation of said speed shaft relative to said output shaft; and
a shift mechanism for coupling said reverse gear to said second synchronizer clutch such that said reverse gear moves between its first and second positions in response to movement of said second clutch between its first and third positions.

19. The transmission of claim 18 wherein said first gearset is located between said second and third gearsets.

20. The transmission of claim 18 wherein said first clutch is supported on said output shaft between said first and second gearsets and includes a first shift sleeve movable from a first position to a second position for releasably coupling said first speed gear to said output shaft for establishing a first drive connection between said input shaft and said output shaft at said first forward speed ratio, said first shift sleeve is movable from said first position to a third position for releasably coupling said second speed gear to said output shaft for establishing a second drive connection between said input shaft and said output shaft at said second forward speed ratio, and wherein said second clutch is supported on said output shaft between said first and third gearsets and includes a second shift sleeve movable from said first position to said second position for coupling said third input gear to said input shaft for establishing a third drive connection between said input shaft and said output shaft at said third forward speed ratio, and wherein movement of said second shift sleeve from said first position to said third position occurs when said output shaft is substantially non-motive such that rotation of said first gearset is inhibited which causes rotation of said input shaft to be inhibited without coupling said second shift sleeve to said first speed gear.

21. The transmission of claim 18 further comprising a differential having an input driven by said output shaft and a pair of outputs adapted to be coupled to a set of wheels.

22. A transmission comprising:
an input shaft adapted to be rotatably driven in a first direction;
an output shaft;
a first gearset including a first input gear fixed to said input shaft, and a first speed gear rotatably supported on said output shaft and meshed with said first input gear;

a second gearset including a second input gear fixed to said input shaft, and a second speed gear rotatably supported on said output shaft and meshed with said second input gear;

a first synchronizer clutch for releasably coupling one of said first and second speed gears to said output shaft for driving said output shaft in a first direction relative to said input shaft at one of a first and second forward gear ratio;

a third gearset including a third input gear rotatably supported on said input shaft, and a third speed gear fixed to said output shaft and meshed with said third input gear;

a fourth gearset including a fourth input gear rotatably supported on said input shaft, and a fourth speed gear fixed to said output shaft and meshed with said fourth input gear;

a second synchronizer clutch for releasably coupling one of said third and fourth input gears to said input shaft for driving said output shaft in said first direction relative to said input shaft at one of a third and fourth forward gear ratio;

a fifth gearset including a fifth input gear rotatably supported on said input shaft, and a fifth speed gear fixed to said output shaft and meshed with said fifth input gear;

a third synchronizer clutch movable from a first position to a second position for coupling said fifth input gear to said input shaft for driving said output shaft in said first direction relative to said input shaft at a fifth forward gear ratio, and said second synchronizer clutch is movable from said first position to a third position for causing speed synchronization between said input shaft and said third input gear;

a reverse gear movable between a first position disengaged from meshed engagement with said input and output shafts and a second position in meshed engagement therewith for driving said output shaft in a second direction relative to said input shaft at a reverse speed ratio; and a shift mechanism for coupling said reverse gear to said third synchronizer clutch such that said reverse gear moves between its first and second positions in response to movement of said third synchronizer clutch between its first and third positions.

23. The transmission of claim 22 wherein said third gearset is located between said second and third synchronizer clutches.

24. The transmission of claim 22 wherein said output shaft is held against rotation when said third synchronizer clutch is moved from its first position to its third position such that said input shaft is braked against said third input gear.

25. The transmission of claim 22 further comprising a differential having an input driven by said output shaft and a pair of outputs adapted to be coupled to a set of wheels.

* * * * *